United States Patent [19]
Fukaya

[11] Patent Number: 6,082,784
[45] Date of Patent: Jul. 4, 2000

[54] CONNECTION STRUCTURE AND PROCESS FOR CONNECTING EYE-JOINTS AND SLENDER METAL PIPES

[75] Inventor: Kazumi Fukaya, Mishima, Japan

[73] Assignee: Usui Kokusai Sangyo Kaisha Limited, Japan

[21] Appl. No.: 09/280,432

[22] Filed: Mar. 29, 1999

Related U.S. Application Data

[62] Division of application No. 08/774,595, Dec. 30, 1996, Pat. No. 5,890,287.

[30] Foreign Application Priority Data

| Jan. 10, 1996 | [JP] | Japan | 8-019449 |
| Jan. 11, 1996 | [JP] | Japan | 8-020360 |
| Dec. 27, 1996 | [JP] | Japan | 8-358884 |

[51] Int. Cl.⁷ ..................................... F16L 13/14
[52] U.S. Cl. ................. 285/382; 285/382.2; 285/906; 285/351
[58] Field of Search ................ 285/382, 382.2, 285/382.4, 382.5, 347, 906, 351

[56] References Cited

U.S. PATENT DOCUMENTS

| 1,686,254 | 10/1928 | Rachlin | 285/382.5 |
| 1,976,589 | 10/1934 | Trickey | 285/347 X |
| 2,138,946 | 12/1938 | Trickey | 285/347 X |
| 3,223,438 | 12/1965 | DeCenzo | 285/347 X |
| 3,596,934 | 8/1971 | DeCenzo | 285/347 X |
| 3,596,939 | 8/1971 | Gibson . | |
| 4,776,616 | 10/1988 | Umehara et al. . | |
| 4,902,049 | 2/1990 | Umehara . | |
| 5,492,376 | 2/1996 | Usui et al. . | |

FOREIGN PATENT DOCUMENTS

| 0 276 483 | of 1988 | European Pat. Off. . |
| 0 412 626 | of 1991 | European Pat. Off. . |
| 2 305 360 | of 1974 | Germany . |
| 4-165189 | of 1992 | Japan . |
| 4-165190 | of 1992 | Japan . |
| 4-302796 | of 1992 | Japan . |
| 4-357388 | of 1992 | Japan . |
| 995335 | of 1965 | United Kingdom . |
| WO 90/00697 | of 1990 | WIPO . |

Primary Examiner—Dave W. Arola
Attorney, Agent, or Firm—Anthony J. Casella; Gerald E. Hespos; Michael J. Porco

[57] ABSTRACT

There are provided a connection structure and process for connecting an eye-joint and a slender metal pipe, which is enabled by making the welding operation completely unnecessary to eliminate the working troubles and a fear of cracking or breakage, as might otherwise be caused by deteriorations in the mechanical properties in the vicinity of the connection end portion, which can use the eye-joint body and the metal pipe, as plated with a corrosion-resistance substance or coated with a resin in advance, to improve the productivity drastically thereby to ensure the connection with neither axial nor circumferential movement, and which can connect a metal pipe, if necessary, as having a diameter larger than the width of the eye-joint body. The connection structure comprises: an eye-joint body having an annular groove in its head and two side through holes leading to the annular groove to form parallel flat seat surfaces on the outer circumferences of the through holes, and including a branch pipe protruded integrally from the eye-joint body and having a stepped fitting hole formed in the circumferential side and leading to the annular groove; and a slender metal pipe adapted to have its connection end portion fitted in the fitting hole of the branch pipe of the eye-joint body. An elastic seal ring member is fitted either in the inner circumference of the fitting hole or on the outer circumference of the connection end portion of the metal pipe. The vicinity of the end portion of the branch pipe is caulked together with the connection end portion, after the connection end portion is inserted into the branch pipe, thereby to effect the connection.

22 Claims, 4 Drawing Sheets

CONNECTION STRUCTURE AND PROCESS FOR CONNECTING EYE-JOINTS AND SLENDER METAL PIPES

This application is a division of application Ser. No. 08/774,595 filed Dec. 30, 1996 now U.S. Pat. No. 5,890,287.

BACKGROUND OF THE INVENTION

1. Field of the Invention

The present invention relates generally to a relatively thin and slender metal pipe having a diameter of about 20 mm or less and arranged as feed passages for feeding oil and air to automobiles and various machines and apparatus and, more particularly, to a connection structure and process for connecting an eye-joint acting as a connecting fitting at a connecting end portion.

2. Description of the Prior Art

A branch pipe (21'), which has a fitting hole (23) leading to an annular groove (22) formed in the head of an eye-joint body (21), and a metal pipe ($P_1$) are connected to each other by welding them at (W), such that a connection end portion ($P_1$') of the metal pipe ($P_1$) is inserted in the fitting hole (23) of the branch pipe (21').

In this prior art, however, the welding work (W) has not only invited a reduction in the workability but also often caused a leakage because of the uncertain work. At the same time, the overheating by the torch for the welding operation has raised a problem that a cracking or breakage is caused with the arrangement in a vibrating state at the side of the metal pipe ($P_1$) in the vicinity of the connection end portion. In relation to the welding work (W), on the other hand, it has been impossible to use the eye-joint body (21) and the metal pipe ($P_1$) which are either plated with a corrosion-resistant material or coated with a resin in advance, and this plating or coating treatment is required after the welding operation. As a result, the metal pipe ($P_1$), which has already been bent into a complicated shape, may be poorly plated or coated to an uneven thickness in the plated or coated film.

SUMMARY OF THE INVENTION

The present invention has been conceived in view of the above-specified problems of the prior art and has an object to provide a connection structure and process for connecting an eye-joint and a slender metal pipe, which is enabled by making the welding operation completely unnecessary to eliminate the working troubles and a fear of cracking or breakage, as might otherwise be caused by deteriorations in the mechanical properties in the vicinity of the connection end portion, which can use the eye-joint body and the metal pipe, as plated with a corrosion-resistance substance or coated with a resin in advance, to improve the productivity drastically thereby to ensure the connection with neither axial nor circumferential movement, and which can connect a metal pipe, if necessary, as having a diameter larger than the width of the eye-joint body.

In order to achieve the above-specified object, according to a first mode of embodiment of the present invention, there is provided a connection structure for connecting an eye-joint and a slender metal pipe, comprising: an eye-joint body having an annular groove in its head and two side through holes leading to said annular groove to form parallel flat seat surfaces on the outer circumferences of said through holes, and including a branch pipe protruded integrally from said eye-joint body and having a stepped fitting hole formed in the circumferential side and leading to said annular groove; and a slender metal pipe adapted to have its connection end portion fitted in the fitting hole of the branch pipe of said eye-joint body, wherein the improvement comprises: an elastic seal ring member fitted either in the inner circumference of said fitting hole or on the outer circumference of the connection end portion of said metal pipe; hold means for holding said elastic seal ring member in position; and caulking means for caulking the vicinity of the end portion of said branch pipe together with said connection end portion, after said connection end portion is inserted into said branch pipe, thereby to effect the connection.

According to a second mode of embodiment of the present invention, on the hand, there is provided a connection structure for connecting an eye-joint and a slender metal pipe, comprising: an eye-joint body having an annular groove in its head and two side through holes leading to said annular groove to form parallel flat seat surfaces on the outer circumferences of said through holes, and including a branch pipe protruded integrally from said eye-joint body and having a stepped fitting hole in the circumferential side and leading to said annular groove, and an annular recess in the circumference said fitting hole; an elastic seal ring member fitted in the annular recess of said branch pipe; and a slender metal pipe fitted at its connection end portion in the fitting hole of said eye-joint body, so that the vicinity of the end portion of said branch pipe is caulked together with said connection end portion thereby to effect the connection.

According to a third mode of embodiment of the present invention, moreover, there is provided a connection structure for connecting an eye-joint and a slender metal pipe, comprising: an eye-joint body having an annular groove in its head and two side through holes leading to said annular groove to form parallel flat seat surfaces on the outer circumferences of said through holes, and including a branch pipe protruded integrally from said eye-joint body and having a stepped fitting hole in the circumferential side and leading to said annular groove, and an annular recess in the circumference said fitting hole; an elastic seal ring member fitted in the annular recess of said branch-pipe; and a slender metal pipe having an annular ridge in the vicinity of said end portion and fitted at its connection end portion in the fitting hole of said eye-joint body, so that the end portion of said branch pipe is caulked to effect the connection.

Next, according to a fourth mode of embodiment of the present invention, there is provided a connection structure for connecting an eye-joint and a slender metal pipe, comprising: an eye-joint body having an annular groove in its head and two side through holes leading to said annular groove to form parallel flat seat surfaces on the outer circumferences of said through holes, and including a radially expanded branch pipe protruded integrally from said eye-joint body and having a stepped fitting hole in the circumferential side and leading to said annular groove, and an annular recess in the circumference said fitting hole; and a slender metal pipe having at least one annular groove in the vicinity of its end portion, and a radially expanded connection end portion having an elastic seal ring member in said annular recess, so that said expanded connection end portion is inserted into the fitting hole of said eye-joint body to bring the leading end portion of said metal pipe into abutment against the step of said fitting hole, and so that the vicinity of the end portion of said branch pipe is caulked to push said connection end portion thereby to effect the connection.

According to a fifth mode of embodiment of the present invention, still moreover, there is provided a connection process for connecting an eye-joint and a slender metal pipe, comprising the steps of: cutting to shape an annular groove in the head of an eye-joint body, two side through holes leading to said annular groove, parallel flat seat surfaces on the outer circumferences of said through holes, and a stepped fitting hole leading through said annular recess and formed in a branch pipe protruded integrally from the circumferential side portion of said eye-joint body; rolling said branch pipe to form an annular recess in the inner circumference of the fitting hole of said branch pipe; fitting an elastic seal ring member in the annular recess of said branch pipe; inserting the connection end portion of a slender metal pipe into the fitting hole of said eye-joint body; and caulking the vicinity of the end portion of said branch pipe together with the connection end portion of said metal pipe thereby to effect the connection.

According to a sixth mode of embodiment of the present invention, still moreover, a connection process for connecting an eye-joint and a slender metal pipe, comprising the steps of: cutting to shape an annular groove in the head of an eye-joint body, two side through holes leading to said annular groove, parallel flat seat surfaces on the outer circumferences of said through holes, and a stepped fitting hole leading through said annular recess and formed in a branch pipe protruded integrally from the circumferential side portion of said eye-joint body; rolling said branch pipe to form an annular recess in the inner circumference of the fitting hole of said branch pipe; fitting an elastic seal ring member in the annular recess of said branch pipe; inserting the connection end portion of a slender metal pipe into the fitting hole of said eye-joint body; and caulking the vicinity of the end portion of said branch pipe together with the connection end portion of said metal pipe thereby to effect the connection.

According to a seventh mode of embodiment of the present invention, still moreover, there is provided a connection process for connecting an eye-joint and a slender metal pipe, comprising the steps of: cutting to shape an annular groove in the head of an eye-joint body, two side through holes leading to said annular groove, parallel flat seat surfaces on the outer circumferences of said through holes, and a stepped fitting hole leading through said annular recess and formed in a branch pipe protruded integrally from the circumferential side portion of said eye-joint body; rolling said branch pipe to form an annular recess in the inner circumference of the fitting hole of said branch pipe; fitting an elastic seal ring member in the annular recess of said branch pipe; punching a slender metal pipe from the leading end portion to form an annular ridge; inserting the connection end portion of said slender metal pipe into the fitting hole of said eye-joint body while radially expanding the leading end side; and caulking the radially expanded end portion of said branch pipe thereby to effect the connection.

According to an eighth mode of embodiment of the present invention, on the other hand, there is provided a connection process for connecting an eye-joint and a slender metal pipe, comprising the steps of: cutting a forged material in advance to shape an annular groove in the head of an eye-joint body, two side through holes leading to said annular groove, parallel flat seat surfaces on the outer circumferences of said through holes, and a stepped fitting hole leading through said annular recess and formed in a branch pipe protruded integrally from the circumferential side portion of said eye-joint body; forcing a mandrel into the fitting hole of the branch pipe of said eye-joint body to expand said branch pipe radially; rolling the outer circumference in the vicinity of the other end portion of a slender metal pipe to form at least one annular recess; fitting an elastic seal ring member in said annular recess; inserting the radially expanded connection end portion of said metal pipe into the fitting hole of said eye-joint body; bringing the leading end portion of said metal pipe into abutment against the step of said fitting hole; and caulking the vicinity of the end portion of said branch pipe to press said connection end portion thereby to effect the connection.

Next, according to a ninth mode of embodiment of the present invention, there is provided a connection process for connecting an eye-joint and a slender metal pipe, comprising the steps of: cutting a forged material in advance to shape an annular groove in the head of an eye-joint body, two side through holes leading to said annular groove, parallel flat seat surfaces on the outer circumferences of said through holes, and a stepped fitting hole leading through said annular recess and formed in a branch pipe protruded integrally from the circumferential side portion of said eye-joint body; forcing a mandrel into the fitting hole of the branch pipe of said eye-joint body to expand said branch pipe radially; punching the outer circumference in the vicinity of the other end portion of a slender metal pipe from the leading end portion to form at least one annular ridge; fitting an elastic seal ring member on said annular ridge; inserting the radially unexpanded connection end portion of said metal pipe into the fitting hole of said eye-joint body; bringing the leading end portion of said metal pipe into abutment against the step of said fitting hole; and caulking the vicinity of the end portion of said branch pipe to press said connection end portion thereby to effect the connection.

As the connection structure and process thus made according to the present invention, the connection is effected by fitting the connection end portion of the metal pipe in the fitting hole in a manner to closely fit the elastic seal ring member either on the inner circumference of the branch pipe at the side of the eye-joint body or in the outer circumference of the connection end portion of the metal pipe, and by caulking either the vicinity of the end portion of the branch pipe together with the connection end portion of the metal pipe or the vicinity of the end portion of the branch pipe, as expanded in advance, to effect the connection. As a result, by making the welding operation completely unnecessary for the connection, it is possible to eliminate the working troubles and a fear of cracking or breakage, as might otherwise be caused by deteriorations in the mechanical properties due to the overheating in the vicinity of connection end portion. It is also possible to use the eye-joint body and the metal pipe, as plated with a corrosion-resistance substance or coated with a resin in advance. If is further possible to improve the productivity thereby to ensure the connection by the close fitting of the seal ring member with neither axial nor circumferential movement. If the branch pipe at the side of the eye-joint body is radially expanded, the seal ring member can be easily fitted to retain the internal diameters of the branch pipe and the metal pipe to be connected, thereby to minimize the flow resistance to the internal fluid. At the same time, it is possible to connect the metal pipe larger than the width of the eye-joint body, so that the range of application can be widened.

DETAILED DESCRIPTION OF THE PREFERRED EMBODIMENTS

Figure 2:
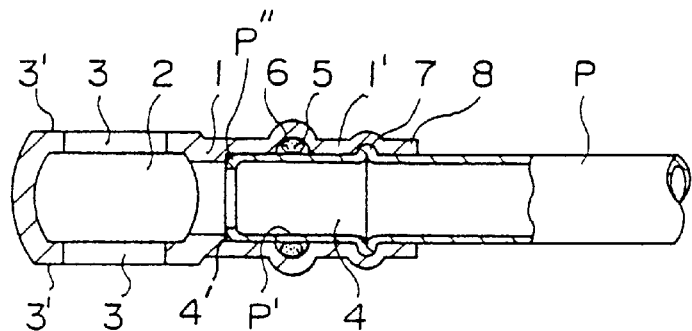
FIG. 2 is similar to FIG. 1 but shows another embodiment of that of FIG. 1.

Reference numeral (1) designates an eye-joint body made of steel, which has been cut to form an annular groove (2) in the head, through holes (3) leading to the groove, parallel flat seat surfaces (3') and (3') on the circumferential portions of the outer sides of the through hole, and a stepped fitting hole (4) extending into the groove (2) at the side of a branch pipe (1'), as protruded integrally from the circumferential side portion, and having a step (4'). In the embodiment of FIG. 2, the leading end side of the fitted hole (4) is expanded in advance, as indicated by double dotted lines.

In this mode of embodiment, on the other hand, the inner circumference of the fitting hole (4) of the branch pipe (1') is bulged outward by a rolling treatment to form at least one annular recess (6), and an elastic seal ring member (5) is fitted in that recess (6).

Figure 1:
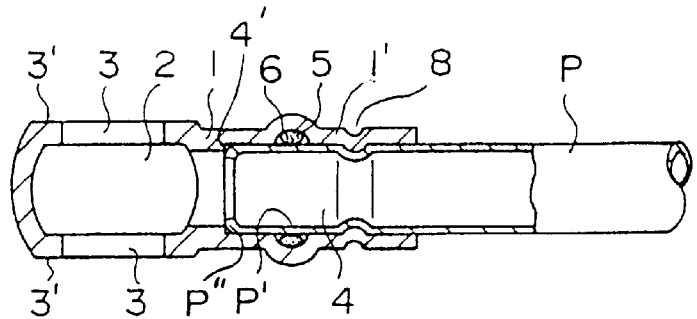
FIG. 1 is a longitudinal section showing one mode of embodiment of a connection structure according to a process of the present invention for connecting an eye-joint and a slender metal pipe.
Figure 3:
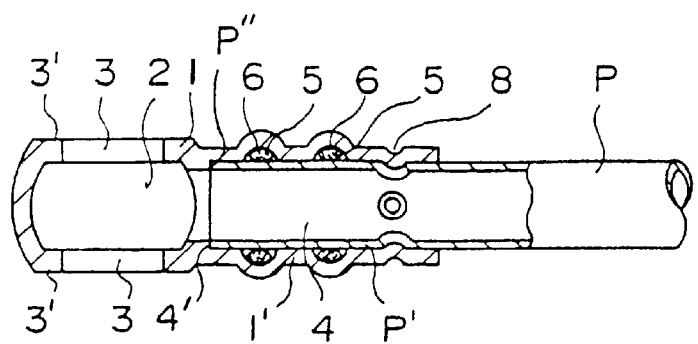
FIG. 3 is similar to FIG. 1 but shows still another embodiment of that of FIG. 1.

On the other hand, letter (P) designates a metal pipe having a relatively small diameter of about 20 mm or less. An annular ridge (7) is formed, if necessary, as shown in FIG. 2, on the connection end portion (P') of the metal pipe (P) in the vicinity of the end portion by pressing (as will be detained later) the leading end portion. After this, the connection end portion (P') of the metal pipe (P) is fitted in the fitted hole (4), and the branch pipe (1') is caulked at (8) in the vicinity of its end portion together with the connection end portion (P'), as shown in FIGS. 1 and 3, either at several circumferential portions (as shown in FIG. 3) or annularly (as shown in FIG. 1), thereby to effect the connection with the seal ring member being closely fitted. As shown in FIG. 2, alternatively, the connection end portion (P') of the metal pipe (P) is fitted in the expanded portion at the leading end side of the fitting hole (4), and the expanded end portion of the branch pipe (1') is caulked at (8) to clamp the annular ridge (7) of the connection end portion (P'), thereby to effect the connection with the seal ring member being closely fitted. Incidentally, in order to ensure the connection, a leading end (P") of the metal pipe (P) is preferably held in abutment against the step (4') of the fitting hole (4).

With reference to FIGS. 4 to 11, here will be described other embodiments of the present invention, the same component of which as those of the foregoing embodiments are designated at the same reference numerals.

In these modes of embodiment, the reference numeral (1) designates the eye-joint body which is forged. Like the foregoing embodiments of FIGS. 1 to 3, however, the eye-joint body (1) has also been cut to form an annular groove (2) in the head, through holes (3) leading to the groove, parallel flat seat surfaces (3') and (3') on the circumferential portions of the outer sides of the through hole, and a stepped fitting hole (4) extending into the groove (2) at the side of a branch pipe (1'), as protruded integrally from the circumferential side portion, and having a step (4').

Next, the branch pipe (1') of the eye-joint body (1) thus constructed is preferably expanded by pressing and inserting a mandrel (9') into the fitting hole (4). Incidentally, reference numeral (9) appearing in FIG. 8 designates a split chuck for setting the head of the eye-joint body (1). With some increases in the weight of the material and in the number of cutting operations, moreover, the branch pipe (1') may be radially enlarged at the time of forging the material.

Figure 4:
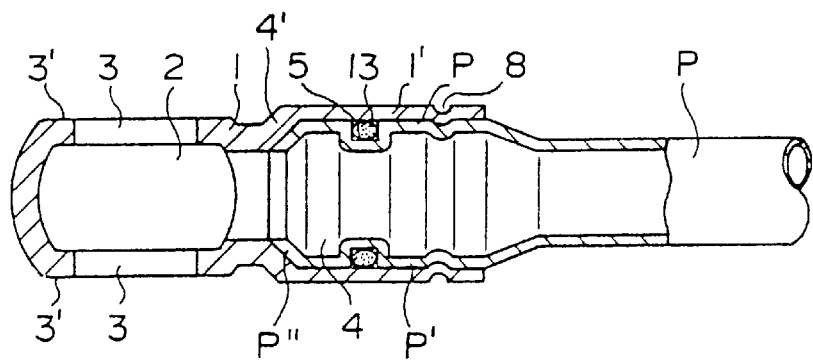
FIG. 4 is a longitudinal section showing another mode of embodiment of a connection structure according to a process of the present invention for connecting an eye-joint and a slender metal pipe.
Figure 5:
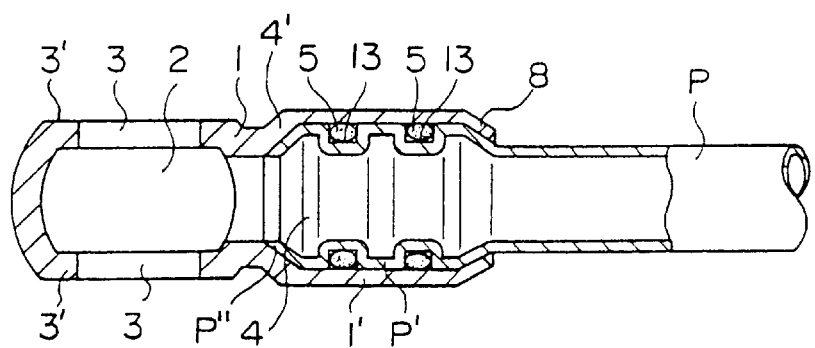
FIG. 5 is similar to FIG. 1 but shows another embodiment of that of FIG. 4.
Figure 9:
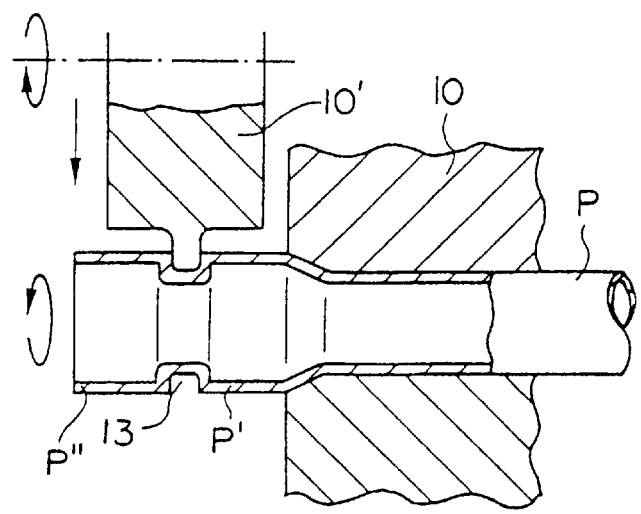
FIG. 9 is a partially cut-away section showing the state in which an annular recess is formed at a metal pipe.

On the other hand, the metal pipe (P) has, in the vicinity of its end portion, the connection end portion (P') which is expanded by forming one or two annular grooves (13) in the outer circumference of the metal pipe (P) by the rolling treatment using a rolling tool (10') held by a holding chuck (10), as shown in FIG. 9, and by fitting the elastic seal ring member or members (5) in the annular groove or grooves, as shown in FIGS. 4 and 5.

Figure 6:
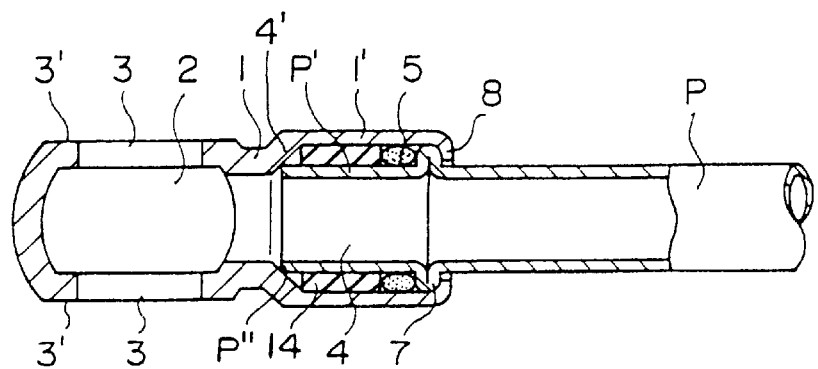
FIG. 6 is similar to FIG. 1 but shows still another embodiment of that of FIG. 4.
Figure 7:
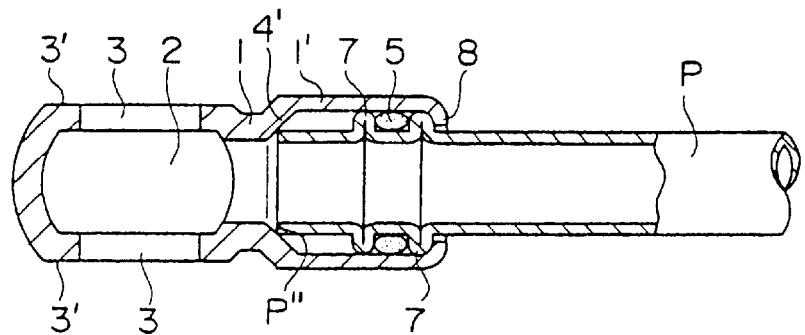
FIG. 7 is similar to FIG. 3 but shows still another embodiment of that of FIG. 4.
Figure 8:
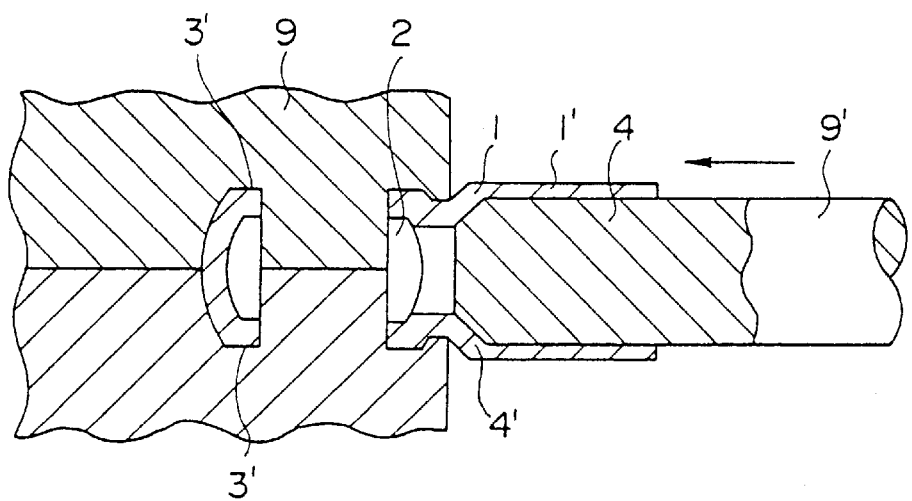
FIG. 8 is a partially cut-away section showing the state in which the branch pipe at the side of the eye-joint body relating to the connection method according to another mode of embodiment of the present invention is expanded.
Figure 10:
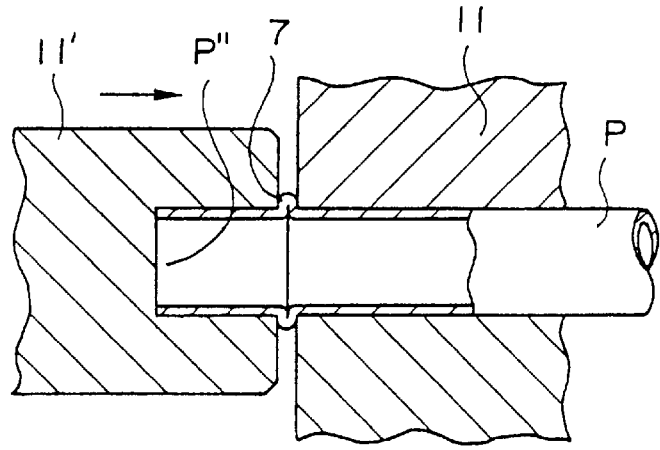
FIG. 10 is a partially cut-away section showing the state in which an annular ridge is formed at a metal pipe.
Figure 11:
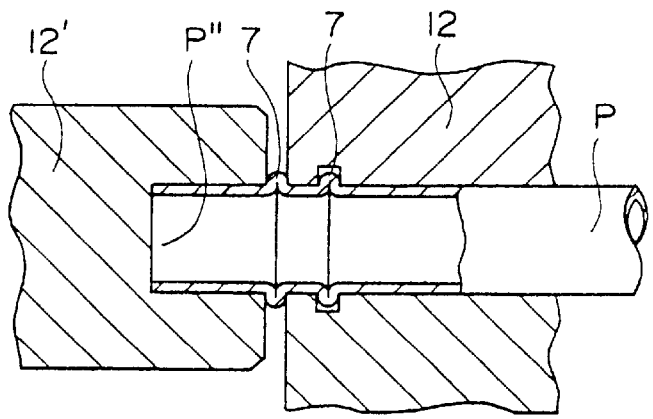
FIG. 11 is an enlarged section at the time when two or more annular recesses are formed.
Figure 12:
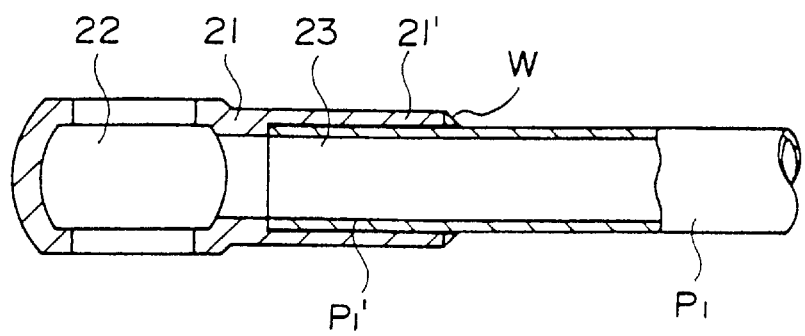
FIG. 12 is a longitudinal section showing a connection structure according to the connection method of the prior art.

Alternatively, in the vicinity of the end portion of the metal pipe (P), there may be formed one annular ridge (7) by pressing the leading end (P") of the metal pipe (P), as fixed by a chuck (11), as shown in FIG. 10, by means of a punch tool (11'), or there may be formed a pair of annular ridges (7) by means of a punching tool (12'), as fixed again by a groove chuck (12), as shown in FIG. 11, after the treatment of FIG. 7. Then, the connection end portion (P') may have the elastic seal ring member (5) fitted, as shown in FIGS. 6 and 7, between the annular ridges formed on the outer circumference of the metal pipe (P), while retaining its original diameter as it is. Incidentally, reference numeral (14) designates a bushing member.

With the expanded end portion or the unexpanded connection end portion being fitted in the fitting hole (4), the leading end (P") of the metal pipe is brought into abutment against the step (4') of the fitting hole (4). At the same time, the seal ring member (5) is pushed and closely fitted, and the end portion of the branch pipe (1') is caulked at (8) onto the connection end portion (P'), thereby to effect the connection.

As has been described hereinbefore, the present invention is constructed by the connection structure and process for connecting the eye-joint and the slender metal pipe. As a result, by making the welding operation completely unnecessary for the connection, it is possible to eliminate the working troubles and a fear of cracking or breakage, as might otherwise be caused by deteriorations in the mechanical properties due to the overheating in the vicinity of the connection end portion (P'). It is also possible to use the eye-joint body (1) and the metal pipe (P), as plated with a corrosion-resistance substance or coated with a resin in advance. If is further possible to improve the productivity thereby to ensure the connection by the close fitting of the seal ring member with neither axial nor circumferential movement. If the branch pipe (1') at the side of the eye-joint body (1) is radially expanded, the seal ring member can be easily fitted to retain the internal diameters of the branch pipe (1) and the metal pipe (P) to be connected, thereby to minimize the flow resistance to the internal fluid. At the same time, it is possible to connect the metal pipe (P) larger than the width of the eye-joint body (1), so that the range of application can be widened. Thus, it is possible to provide a remarkably useful connection structure and process for connecting the eye-joint and the slender metal pipe.

What is claimed is:

1. A connection structure for connecting an eye-joint and a slender metal pipe, comprising: an eye-joint body having an annular groove in its head and two side through holes leading to said annular groove to form parallel flat seat surfaces on the outer circumferences of said through holes, and including a branch pipe protruded integrally from said eye-joint body and having a stepped fitting hole formed in the circumferential side and leading to said annular groove; and a slender metal pipe adapted to have its connection end portion fitted in the fitting hole of the branch pipe of said eye-joint body, wherein the improvement comprises: an elastic seal ring member fitted in the inner circumference of said fitting hole; hold means for holding said elastic seal ring member in position; and caulking means for caulking the vicinity of the end portion of said branch pipe together with said connection end portion, after said connection end portion is inserted into said branch pipe, thereby to effect the connection.

2. A connection structure for connecting an eye-joint and a slender metal pipe according to claim 1, wherein said hold means includes at least one annular recess formed in the inner circumference of said branch pipe.

3. A connection structure for connecting an eye-joint and a slender metal pipe according to claim 1, wherein said hold means includes: one annular ridge formed on the connection end portion of said metal pipe; and a bushing member fitted on the leading end side of said ridge.

4. A connection structure for connecting an eye-joint and a slender metal pipe according to claim 1, wherein said hold means includes a pair of annular ridges formed on the connection end portions of said metal pipe.

5. A connection structure for connecting an eye-joint and a slender metal pipe according to claim 1, wherein said caulking means is applied to the whole circumference of the vicinity of the end portion of said branch pipe.

6. A connection structure for connecting an eye-joint and a slender metal pipe according to claim 1, wherein said caulking means is applied to a plurality of portions of the circumference in the vicinity of the end portion of said branch pipe.

7. A connection structure for connecting an eye-joint and a slender metal pipe according to claim 1, wherein the leading end of the connection end portion of said metal pipe is in abutment against the step of said fitting hole.

8. A connection structure for connecting an eye-joint and a slender metal pipe according to claim 1, wherein the branch pipe of said eye-joint body is radially expanded.

9. A connection structure for connecting an eye-joint and a slender metal pipe according to claim 8, wherein the connection of said metal pipe is radially expanded.

10. A connection structure for connecting an eye-joint and a slender metal pipe, comprising: an eye-joint body having an annular groove in its head and two side through holes leading to said annular groove to form parallel flat seat surfaces on the outer circumferences of said through holes, and including a branch pipe protruded integrally from said eye-joint body and having a stepped fitting hole formed in the circumferential side and leading to said annular groove, and an annular recess in the circumference of said stepped fitting hole; an elastic seal ring member fitted in the annular recess of said branch pipe; and a slender metal pipe fitted at its connection end portion in the fitting hole of said eye-joint body, so that the vicinity of the end portion of said branch pipe is caulked together with said connection end portion thereby to effect the connection.

11. A connection structure for connecting an eye-joint and a slender metal pipe, comprising: an eye-joint body having an annular groove in its head and two side through holes leading to said annular groove to form parallel flat seat surfaces on the outer circumferences of said through holes, and including a branch pipe protruded integrally from said eye-joint body and having a stepped fitting hole formed in the circumferential side and leading to said annular groove, and an annular recess in the circumference of said stepped fitting hole; an elastic seal ring member fitted in the annular recess of said branch pipe; and a slender metal pipe having an annular ridge in the vicinity of said end portion and fitted at its connection end portion in the fitting hole of said eye-joint body, so that the end portion of said branch pipe is caulked to effect the connection.

12. A connection structure for connecting an eye-joint and a slender metal pipe, comprising: an eye-joint body having an annular groove in its head and two side through holes leading to said annular groove to form parallel flat seat surfaces on the outer circumferences of said through holes, and including a radially expanded branch pipe protruded integrally from said eye-joint body and having a stepped fitting hole formed in the circumferential side and leading to said annular groove, and an annular recess in the circumference of said stepped fitting hole; and a slender metal pipe having at least one annular opening in the vicinity of its end portion, and a radially expanded connection end portion having an elastic seal ring member in said annular recess, so that said expanded connection end portion is inserted into the fitting hole of said eye-joint body to bring the leading end portion of said metal pipe into abutment against the step of said fitting hole, and so that the vicinity of the end portion of said branch pipe is caulked to push said connection end portion thereby to effect the connection.

13. A connection structure for connecting an eye-joint and a slender metal pipe, comprising: an eye-joint body having an annular groove in its head and two side through holes leading to said annular groove to form parallel flat seat surfaces on the outer circumferences of said through holes, and including a radially expanded branch pipe protruded integrally from said eye-joint body and having a stepped fitting hole formed in the circumferential side and leading to said annular groove, and an annular recess in the circumference of said stepped fitting hole; and a slender metal pipe having at least one annular opening in the vicinity of its end portion, and a radially unexpanded connection end portion; an elastic seal ring member in said annular recess, said unexpanded connection end portion is inserted into the fitting hole of said eye-joint body to bring the leading end portion of said metal pipe into C1 abutment against the step of said fitting hole, and the vicinity of the end portion of said branch pipe is caulked to deform said unexpanded connection end portion thereby to effect the connection.

14. A connection structure for connecting an eye-joint and a slender metal pipe, comprising: an eye-joint body having an annular groove in its head and two side through holes leading to said annular groove to form parallel flat seat surfaces on the outer circumferences of said through holes, and including a branch pipe protruded integrally from said eye-joint body and having a stepped fitting hole formed in the circumferential side and leading to said annular groove; and a slender metal pipe adapted to have its connection end portion fitted in the fitting hole of the branch pipe of said eye-joint body, wherein the improvement comprises: an elastic seal ring member fitted in the outer circumference of the connection end portion of said metal pipe; hold means for holding said elastic seal ring member in position; and caulking means for caulking the vicinity of the end portion of said branch pipe together with said connection end portion, after said connection end portion is inserted into said branch pipe, thereby to effect the connection.

15. A connection structure for connecting an eye-joint and a slender metal pipe according to claim 14, wherein said hold means includes at least one annular recess formed in the inner circumference of said branch pipe or in the outer circumference of the connection end portion of said metal pipe.

16. A connection structure for connecting an eye-joint and a slender metal pipe according to claim 14, wherein said hold means includes: one annular ridge formed on the connection end portion of said metal pipe; and a bushing member fitted on the leading end side of said ridge.

17. A connection structure for connecting an eye-joint and a slender metal pipe according to claim 14, wherein said hold means includes a pair of annular ridges formed on the connection end portions of said metal pipe.

18. A connection structure for connecting an eye-joint and a slender metal pipe according to claim 14, wherein said caulking means is applied to the whole circumference of the vicinity of the end portion of said branch pipe.

19. A connection structure for connecting an eye-joint and a slender metal pipe according to claim 14, wherein said caulking means is applied to a plurality of portions of the circumference in the vicinity of the end portion of said branch pipe.

20. A connection structure for connecting an eye-joint and a slender metal pipe according to claim 14, wherein the leading end of the connection end portion of said metal pipe is in abutment against the step of said fitting hole.

21. A connection structure for connecting an eye-joint and a slender metal pipe according to claim 14, wherein the branch pipe of said eye-joint body is radially expanded.

22. A connection structure for connecting an eye-joint and a slender metal pipe according to claim 21, wherein the branch pipe of said eye-joint body is radially expanded.

* * * * *